United States Patent
Williams et al.

(10) Patent No.: US 11,668,213 B2
(45) Date of Patent: Jun. 6, 2023

(54) HIGH CAPACITY OIL FILTER

(71) Applicant: K&N Engineering, Inc., Riverside, CA (US)

(72) Inventors: Steve Williams, Beaumont, CA (US); Jonathan Richard Fiello, Yucaipa, CA (US); Gilbert Heck, Nuevo, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 15/336,580

(22) Filed: Oct. 27, 2016

(65) Prior Publication Data

US 2017/0122152 A1 May 4, 2017

Related U.S. Application Data

(60) Provisional application No. 62/247,685, filed on Oct. 28, 2015.

(51) Int. Cl.
| | |
|---|---|
| *F01M 11/03* | (2006.01) |
| *B01D 35/153* | (2006.01) |
| *B01D 35/147* | (2006.01) |
| *B01D 27/10* | (2006.01) |
| *B01D 27/06* | (2006.01) |

(52) U.S. Cl.
CPC ............ *F01M 11/03* (2013.01); *B01D 27/06* (2013.01); *B01D 27/103* (2013.01); *B01D 27/106* (2013.01); *B01D 35/147* (2013.01); *B01D 35/153* (2013.01); *B01D 2201/24* (2013.01); *B01D 2201/342* (2013.01); *F01M 2011/031* (2013.01)

(58) Field of Classification Search
CPC .......... B01D 2201/24; B01D 2201/342; B01D 27/06; B01D 27/103; B01D 27/106; B01D 35/147; B01D 35/153; F01M 11/03; F01M 2011/031; F01M 2001/1085
See application file for complete search history.

(56) References Cited

U.S. PATENT DOCUMENTS 2,884,133 A * 4/1959 Walulik ............... B01D 27/005
                                                      210/136
3,193,101 A * 7/1965 Humbert, Jr. .......... B01D 27/08
                                                      137/516.17

(Continued)

FOREIGN PATENT DOCUMENTS

FR             2300600 A1 *  9/1976  ............. B01D 35/14

*Primary Examiner* — Terry K Cecil
(74) *Attorney, Agent, or Firm* — Rutan & Tucker LLP; Hani Z. Sayed

(57) ABSTRACT

An apparatus and a method are provided for a high capacity oil filter configured to remove contaminants from engine oil flowing within an internal combustion engine. The oil filter comprises a hollow canister having a length and a diameter suitable for housing a large filtration medium. A base gasket forms a fluid-tight seal between the oil filter and the engine. A base plate circulates oil from the engine through the oil filter. An anti-drainback valve prevents oil from draining out of the filter and passages within the engine when the engine is not operating. A key aspect of the present disclosure is that the relatively large dimensions and the configuration of the filtration media provide a large surface area for entrapping contaminants flowing with the engine oil.

12 Claims, 3 Drawing Sheets

(56) References Cited

U.S. PATENT DOCUMENTS

| | | | | |
|---|---|---|---|---|
| 3,224,585 A | * | 12/1965 | Scavuzzo | B01D 35/14 210/232 |
| 3,473,666 A | * | 10/1969 | Humbert, Jr. | B01D 27/08 210/232 |
| 3,722,691 A | * | 3/1973 | Francois | B01D 27/005 210/304 |
| 5,728,298 A | * | 3/1998 | Hamlin | B01D 29/111 210/491 |
| 5,902,478 A | * | 5/1999 | O'Ryan | B01D 27/08 210/232 |
| 6,217,762 B1 | * | 4/2001 | Rooney | B01D 27/08 210/232 |
| 6,783,808 B2 | * | 8/2004 | Lutz | A63B 45/00 427/459 |
| 6,793,808 B2 | * | 9/2004 | McKenzie | B01D 27/08 210/130 |
| 2007/0170101 A1 | * | 7/2007 | Stanhope | B01D 27/103 210/130 |

* cited by examiner

HIGH CAPACITY OIL FILTER

FIELD

The field of the present disclosure generally relates to oil filters. More particularly, the field of the invention relates to an apparatus and a method for a high capacity oil filter for an internal combustion engine.

BACKGROUND

An internal combustion engine comprises a plurality of moving metal components so as to generate rotational motive force as commonly used in motor vehicles. In an absence of lubrication, the metal components would rub against one another, causing overheating and damage due to friction. A well-known method for reducing friction within the engine is to coat the metal components with a suitable lubricant, such as engine oil.

In general, a cleaner motor oil better lubricates an engine of a motor vehicle. As will be appreciated, however, while the motor oil lubricates the engine, abrasion between the components within the engine may occur. As a result, very fine metal particles are introduced slowly into the motor oil. These metal particles cause further friction, and thus cause harm to the engine in the long term. Furthermore, heat and air cause the motor oil to break down into simpler compounds, as well as polymerize into more complex compounds. As those skilled in the art will appreciate, compounds due to oil break-down lubricate an engine as effectively as fresh motor oil. Therefore, maintaining oil is of critical importance as it extends the life of the engine.

An oil filter may be used to remove contaminants due to oil break down and polymerization from engine oil. The oil filter operates to entrap metal and contaminants that are suspended in the motor oil having been circulated through the engine.

In addition to using the oil filter, the motor oil of the engine has to be changed at regular, if not periodic intervals. The amount of time between each oil change may depend on whether conventional or synthetic motor oil is used. The amount of time between each oil change may also depend on the condition of the motor oil, which may be contingent upon the ratio of fresh versus contaminated oil in the engine. Furthermore, the oil filter must also be changed at regular intervals, typically when the motor oil is changed, due to a decrease in effectiveness of the oil filter or an increasing amount of contaminants that are entrapped in the filter.

What is needed, therefore, is an oil filter that provides a greater filtration capability due to an increased capacity and a larger filtration medium than is available in conventional oil filters.

BRIEF DESCRIPTION OF THE DRAWINGS

The drawings refer to embodiments of the present disclosure in which.

Figure 1:
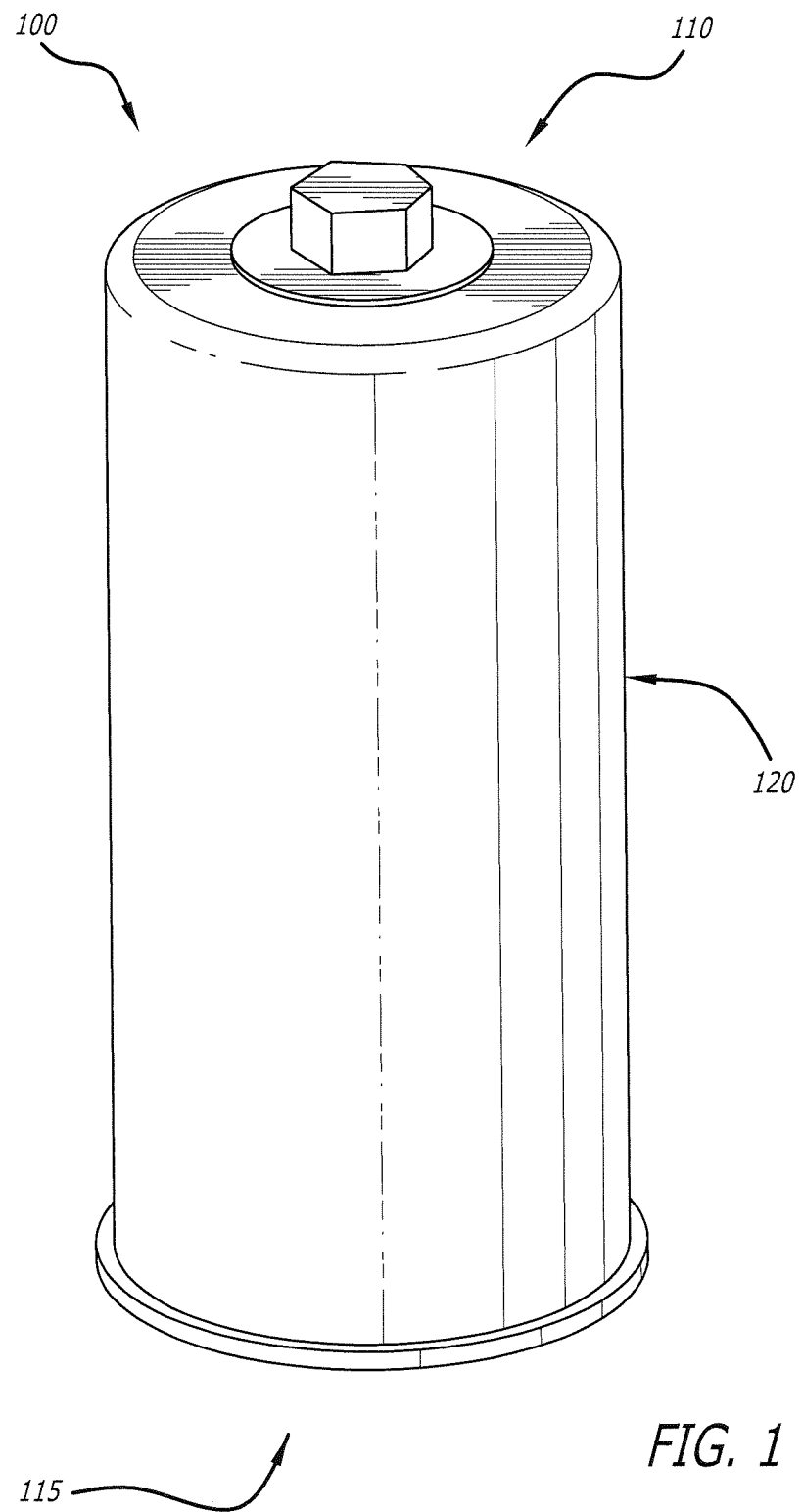
FIG. 1 illustrates a perspective view of an exemplary embodiment of an oil filter in accordance with one embodiment of the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first end," may be made. However, the specific numeric reference should not be interpreted as a literal sequential order but rather interpreted that the "first end" is different than a "second end." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a high capacity oil filter configured to remove contaminants from engine oil. The oil filter comprises a hollow canister having a length and a diameter, and a plurality of oil filtering components housed within the canister. For example, the oil filter may comprise a base gasket, a base plate, an anti-drainback valve, and an oil filtering medium. In an exemplary embodiment, the oil filter is arranged such that the filtering medium is housed within the hollow canister, and held in place by the base plate. In some embodiments, an anti-drainback valve and base gasket are included so as to prevent oil from leaking. In some embodiments, a leaf-spring may be included to further stabilize the oil filter as described herein. A key aspect of the present disclosure is that the dimensions and configuration of the oil filter facilitate using larger sizes of filtering medium, thereby providing a relatively longer surface are for entrapping contaminants flowing with the engine oil.

In one embodiment, a high capacity oil filter for filtering engine oil circulating within an internal combustion engine, is disclosed: a canister comprising a hollow cylindrical body having a length and a diameter; a base gasket configured to establish a fluid-tight seal between the engine and the oil filter; a base plate configured allow circulation of engine oil from the engine through the oil filter; a filter medium configured to entrap contaminants flowing with the engine oil; and an anti-drainback valve. In another embodiment, the high capacity oil filter includes a welded nut configured to facilitate removal of the oil filter from the engine by way of a hand-tool. In yet another embodiment, base plate comprises of a plurality of holes circumferentially disposed around an outlet, wherein the plurality of holes are configured to allow oil into the canister and the outlet is configured to allow oil to exit the canister. In one embodiment, the anti-drainback valve is configured to prevent oil from exiting the oil filter by way of the plurality of holes. In another embodiment, the bypass valve configured to allow oil to bypass the filter medium when the oil is too thick to filter. In one embodiment, a leaf-spring configured to maintain a tight seal between the filter medium and an interior of the canister.

FIG. 1 shows a perspective view of an exemplary embodiment of an oil filter 100 in accordance with the present disclosure. The oil filter 100 comprises a hollow canister 120, having a length and a diameter suitable for being coupled to an internal combustion engine of a motor vehicle. In its most general form, the oil filter 100 comprises a hollow canister 120 having a closed end 110 and an open end 115. The open end 115 is configured to couple with the engine as mentioned above. In an exemplary embodiment, the hollow canister 120 is comprised of a heavy gauge material possessing a relatively high burst and pulsation fatigue strength so as to contain the oil under high pressure. It is envisioned that the hollow canister 120 may be comprised of any lightweight and sturdy material, including by way of non-limiting example, aluminum, titanium, steel, iron, carbon fiber, etc. The canister 120 may have a suitable thickness that depends on a particular application of the oil filter. It is to be understood that the dimensions of the canister 120 may be varied and contingent upon the dimensions of filter element 160 within the oil filter 100. As will be appreciated, the oil filtration capacity, efficiency, and specific flow characteristics with respect to the oil filter 100 will correlate directly with the size and quality of the filtration media disposed within the oil filter 100. The dimensions of the oil filter 100 may be increased or decreased so as to accommodate various engine applications.

Figure 2:
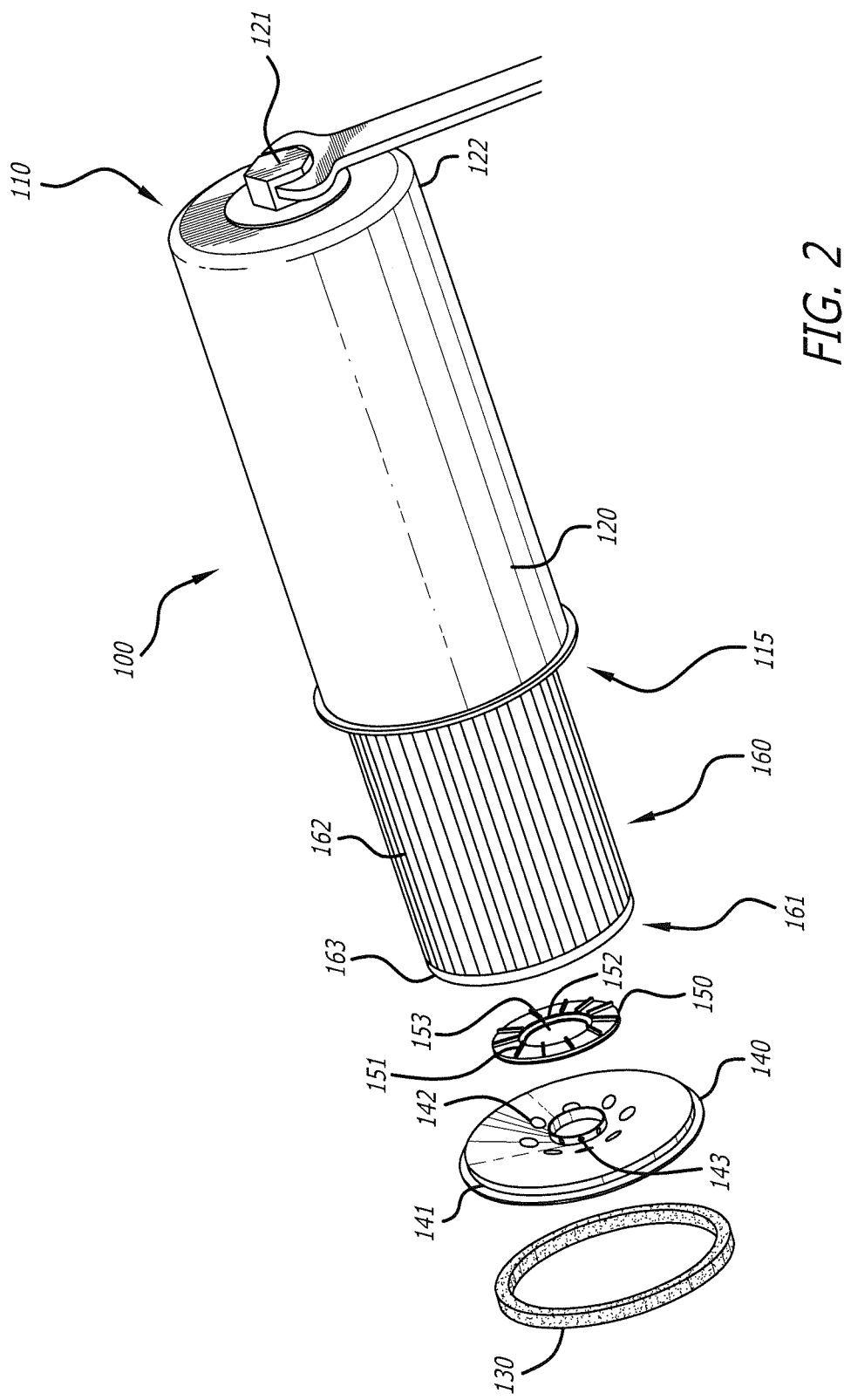
FIG. 2 illustrates an exploded view of an exemplary embodiment of an oil filter in accordance with the present disclosure.

In some embodiments, such as the one shown in FIG. 2, the closed end 110 of the hollow canister 120 includes a welded nut 121 such that the oil filter 100 may be easily removed from the engine by way of an appropriate hand-tool. For example, the welded nut 121 may serve as an engagement point for an optional socket wrench, or other similar tool. The welded nut 121 may be of any size, but in one exemplary embodiment, the welded nut 121 has a diameter of substantially 1.0 inch. Preferably, the oil filter 100 has a length dimension and a diameter that are pre-defined depending on the particular application of the oil filter. In one embodiment, the welded nut 121 includes a drilled safety wire hole, suitable for racing applications. In some embodiments, the closed end 110 of the canister 120 comprises of a series of indentations 122 configured to provide extra grip for a user to cooperate with the oil filter 100.

FIG. 2 illustrates an exploded view of an exemplary embodiment of the oil filter 100 in accordance with principles of the present disclosure. As shown in FIG. 2, the oil filter 100 comprises the hollow canister 120, a base gasket 130, an annular base plate 140, an anti-drainback valve 150, and a filter element 160.

The base gasket 130 generally is annular in shape and configured to couple with the annular base plate 140. In an exemplary embodiment, the base gasket 130 is comprised of premium Butyl Nitrile and rubber, either alone or in combination. As will be appreciated, the gasket serves to prevent oil leaks. Over time, however, the base gasket 130 may harden and introduce leaks into the system. Accordingly, it will be appreciated that the base gasket 130 may be considered a replaceable, albeit important component of the oil filter 100.

As shown in FIG. 2, the annular base plate 140 receives and engages with the base gasket 130. The base plate 140 further comprises an outer seam 141 that is rolled or double rolled so as to receive the open end 115 of the hollow canister 120 and prevent oil leaks. Preferably, the outer seam 141 of the annular base plate 140 couples with the open end 115 of the hollow canister 120, such that the annular base plate 140 is secured to the hollow canister 120 and a fluid-tight seal is established there between. The base plate 140 further comprises a plurality of inlet holes 142 that are circumferentially disposed around a centrally threaded outlet 143, through which filtered oil is directed during operation of the oil filter 100. As such, the base plate 140 serves as an entry and exit point for oil. It is desirable for the threaded outlet 143 to provide some means to attach to the engine, which may vary depending on the specific application. It is to be understood that the annular base plate 140 may include additional structural features configured to promote oil flow into and out of the oil filter 100. Preferably, the base plate 140 is comprised of heavy-duty dichromate, although a number of other suitable materials may be used alone or in combination, without limitation.

As shown in FIG. 2, an anti-drainback valve 150 is coupled to the base plate 140 to prevent oil from draining back through the inlets holes 142 of the base plate 140 during an engine shutoff condition. The anti-drainback valve 150 comprises a generally annular shape, and may further comprise a plurality of protrusions 151, as well as a grooved interior region 152. The anti-drainback valve 150 further comprises of a hole 153 so as to allow out-flow of oil from the oil filter 100, as described above. It is to be appreciated that the anti-drainback valve 150 may be configured into a variety of shapes. In some embodiments, the anti-drainback valve 150 may be arranged between the base plate 140 and the filter element 160, such that it is sealingly engaged between a first end 161 of the filter element 160 and received by the base plate 140. In one embodiment, the anti-drainback valve 150 is generally annular but comprises of a relatively smooth surface without any indentations or protrusions.

Generally, the anti-drainback valve 150 covers the inlet holes 142 of the annular base plate 140, thereby preventing oil from draining back through the inlet holes 142 of the base plate 140. It is to be appreciated that the anti-drainback valve 150 is designed to surround the centrally threaded outlet 143, such that oil may still flow through the outlet 143. The anti-drainback valve 150 may be comprised of silicone, although a plurality of other elastomeric or otherwise appropriately flexible materials may be used without extending beyond the spirit and scope of the present disclosure. As will be appreciated, the anti-drainback valve 150 is further configured to prevent oil from draining from out of passages within the engine, thereby providing an extra degree of lubrication to the engine during cold-start conditions.

Figure 3:
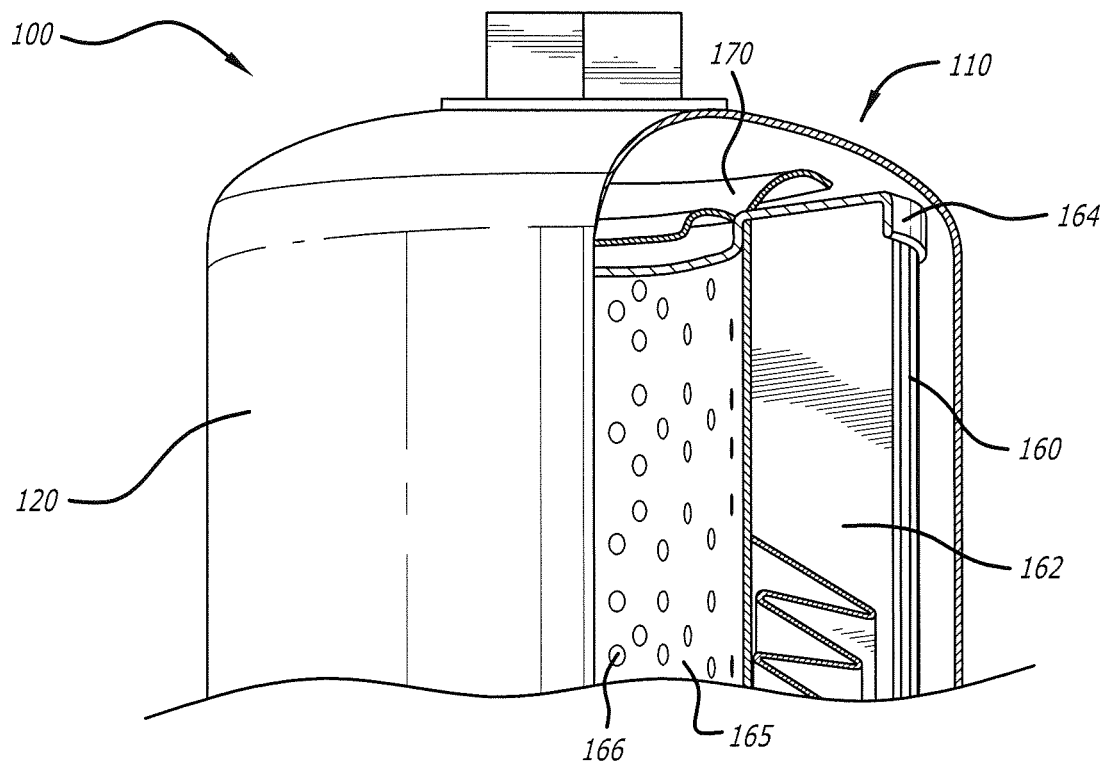
FIG. 3 illustrates a cut-away view of an exemplary embodiment of an oil filter in accordance with the present disclosure.
Figure 3:
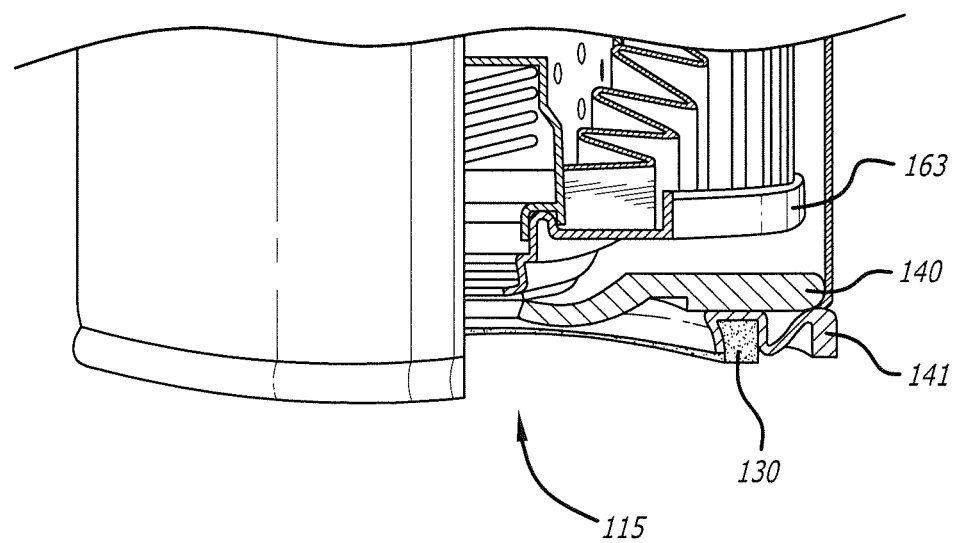

As best shown in FIG. 3, the filter element 160 is comprised of a filter medium 162, first and second end caps 163, 164 and an interior cylinder 165. The interior cylinder 165 provides structure to the filter element 160 such that the filter element 160 does not collapse under pressure due to oil flowing through the filter element. The interior cylinder 165 may be comprised of a generally thin metal and/or plastic material alone or in combination, without limitation. As shown in FIG. 3, the interior cylinder 165 comprises of a plurality of holes 166 that are configured to allow filtered oil to flow from the filter medium 162 into an interior of the interior cylinder 165, and then exit the oil filter by way of the outlet 143. It will be appreciated that the number, size, and positions of the holes cooperate to ensure that oil flow is not restricted. The end caps 163, 164 of the filter element 160 are configured to prevent unfiltered oil from bypassing the filter medium 162 before entering into the interior cylinder 165. As such, the first and second end caps 163, 164 comprise of fiber or metal and are bonded to each end of the filter medium 162. Further, in some embodiments, one of the end caps may include one or more exterior protrusions configured to couple with the hollow canister 120.

It should be understood that the filter medium 162 is configured to allow high oil flow rates while providing outstanding filtration. High filter flow rates are especially important in racing applications where heavier grade oil is typically used and the oil is pumped at relatively high rates. As such, the oil filter 100 of the present disclosure is engineered to filter essentially all grades of synthetic, conventional and blended motor oils. For example, in one embodiment, the filter medium 162 may be comprised of microscopic cellulose fibers along with synthetic fibers, such as glass, polyester, and/or microglass media alone and/or in combination so as to provide lower restriction to oil flowing through the oil filter while maintaining incredible engine protection. In one embodiment, the filter medium 162 may also be saturated with resin to provide further strength and stiffness. Indeed, it should be recognized that a variety of filtering mediums may be incorporated into the oil filter 100, alone or in combination without limitation as discussed herein, depending on the vehicle application. The net result of such filter medium is that vehicles having the oil filter 100 installed will have an extended life and potentially also gain increased performance using metrics such as horsepower and/or torque. Further, the oil filter medium 162 comprises a plurality of pleats, such that the filter medium 162 is folded, thereby increasing a total surface area available for filtration. The number of pleats will generally vary based on a thickness of the filter material. It is understood that the filter material 162 has excellent cold flow characteristics designed to protect the engine, especially during engine start-up. It has been found that the filter medium 162 is capable of preventing substantially 99% of harmful contaminants from being recirculated through the engine of the present disclosure.

As shown in FIG. 3, a leaf spring 170 is sealingly engaged between the second end cap 164 of the filter element 160 and an interior portion of the closed end 110 of the hollow canister 120. In general, the leaf spring 170 provides a positive seal between the filter element 160 and the hollow canister 120. In some embodiments, the leaf spring 170 comprises a thin piece of metal that is configured to retain the filter element 160 tightly pressed against the interior of the hollow canister 120. In some embodiments, the leaf spring 170 may be configured as a tension spring or a coil spring.

Further, in some embodiments, a bypass valve comprising a calibrated spring may be included and arranged between the second end cap 164 of the filter element 160 and the interior of the hollow canister 120 at the closed end 110. In embodiments including the bypass valve, a central opening is included in the end cap 164 such that it may receive the bypass valve therethrough. It will be appreciated that on cold start-up conditions, wherein the oil is too thick to filter, the bypass valve allows unfiltered oil to bypass the filter element 160 until the oil becomes warm enough to filter.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A high capacity oil filter for filtering engine oil circulating within an internal combustion engine, comprising:
 a canister comprising a hollow cylindrical body having a length, a diameter, and an engagement point disposed at a closed end of the canister, wherein the canister includes a welded nut configured as an engagement point and includes a drilled safety wire hole for racing applications and a bypass valve to allow unfiltered oil to bypass the oil filter;
 a base gasket configured to establish a fluid-tight seal between the engine and the oil filter;
 a base plate configured to allow circulation of the engine oil from the engine through the oil filter wherein the base plate contains a plurality of inlet holes that are circumferentially disposed around a centrally threaded outlet;
 a filter medium to entrap contaminants flowing with the engine oil, wherein a first end cap and a second end cap are disposed on opposite ends of the filter medium;
 a leaf spring sealingly engaged between the second end cap of the filter medium and an interior portion of the closed end of the canister, and
 an anti-drainback valve having an annular shape and comprising a center hole and a plurality of protrusions circumferentially surrounding the center hole and a grooved interior region between adjacent ones of the plurality of protrusions that circumferentially surround the center hole, wherein each of the plurality of protrusions extends from an outer perimeter of the anti-drainback valve to the center hole, and wherein the anti-drainback valve is sealingly engaged between the filter medium and the base plate without projecting into an interior of the filter medium.

2. The high capacity oil filter of claim 1, wherein the plurality of holes allow oil into the canister and the outlet allows oil to exit the canister.

3. The high capacity oil filter of claim 1, wherein said leaf-spring comprises a piece of metal configured to maintain a tight seal between the filter medium and the interior portion of the closed end of the canister.

4. The high capacity oil filter of claim 1, wherein the engagement point is configured to receive an optional tool for removal of the oil filter from the internal combustion engine.

5. The high capacity oil filter of claim 4, wherein the engagement point is comprised of a nut-shaped portion suitable for receiving a wrench.

6. The high capacity oil filter of claim 1, wherein the filter medium includes synthetic fibers that are comprised of at least one of glass, polyester, or microglass media.

7. The high capacity oil filter of claim 1, wherein the filter medium further comprises a resin saturation to enhance strength and stiffness of the filter medium.

8. The high capacity oil filter of claim 1, wherein the filter medium is comprised of at least a first type of microscopic fibers and a second type of microscopic fibers.

9. The high capacity oil filter of claim 8, wherein the first type of microscopic fibers is comprised of cellulose fibers and the second type of microscopic fibers is comprised of synthetic fibers.

10. The high capacity oil filter of claim 1, wherein the base plate comprises an outer seam that is rolled in order to receive an open end of the hollow cylindrical body, the open end opposing the closed end.

11. The high capacity oil filter of claim 10, wherein the outer seam couples with the open end of the hollow cylindrical body to establish a fluid-tight seal between the base plate and the hollow cylindrical body.

12. The high capacity oil filter of claim 1, wherein the anti-drainback valve is configured to surround the centrally threaded outlet of the base plate.

\* \* \* \* \*